F. L. TESMER.

TOP FOR VEHICLES.

APPLICATION FILED MAR. 5, 1918.

Reissued Nov. 9, 1920. 14,982.

INVENTOR
Frederick L. Tesmer
By Fay, Oberlin & Fay
ATTORNEYS.

UNITED STATES PATENT OFFICE.

FREDRICK L. TESMER, OF CLEVELAND, OHIO, ASSIGNOR, BY MESNE ASSIGNMENTS, TO THE ASHTABULA BOW SOCKET COMPANY, OF ASHTABULA, OHIO, A CORPORATION OF OHIO.

TOP FOR VEHICLES.

14,982. Specification of Reissued Letters Patent. Reissued Nov. 9, 1920.

Original application filed March 6, 1914, Serial No. 822,847. Renewed April 14, 1917, Serial No. 162,190. Original No. 1,246,352, dated November 13, 1917. Application for reissue filed March 5, 1918. Serial No. 220,648.

*To all whom it may concern:*

Be it known that I, FREDRICK L. TESMER, a citizen of the United States, and a resident of Cleveland, county of Cuyahoga, and State of Ohio, have invented a new and useful Improvement in Tops for Vehicles, of which the following is a specification, the principle of the invention being herein explained and the best mode in which I have contemplated applying that principle, so as to distinguish it from other inventions.

The present improvements relate in general to folding tops for vehicles and the like, and in particular to that type of top which is now generally known among the trade as a "one-man" top. The essential feature of the so-called one-man top is the support of the forward portion from the rear bows of the top without providing any direct supports between the forward portion of the top and the vehicle body. Various attempts have been made along these lines, but it is extremely difficult to provide such a construction which will be both rigid and easy to fold, and unless these two qualities are secured the construction presents but few advantages over the usual type of vehicle top.

In the present invention I have provided a top of this type which requires but a few bows and in which the forwardly extending bows supporting the front end of the top are rigidly secured against side play, the bracing means for the same being so connected that they offer little resistance to folding when the extreme forward bow is bent backwardly. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—

Figure 1:
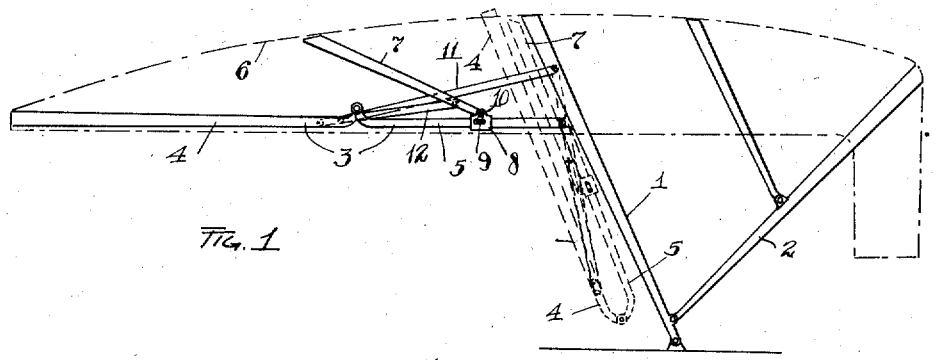
Figure 3:
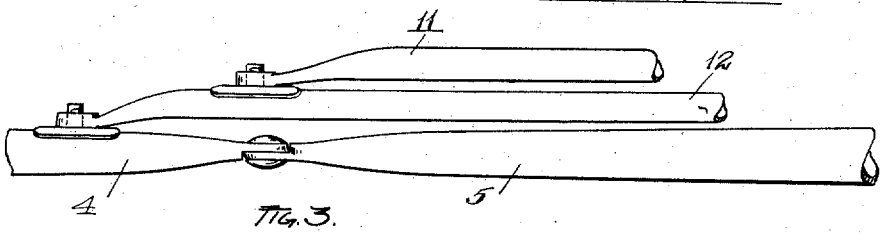
Figure 2:
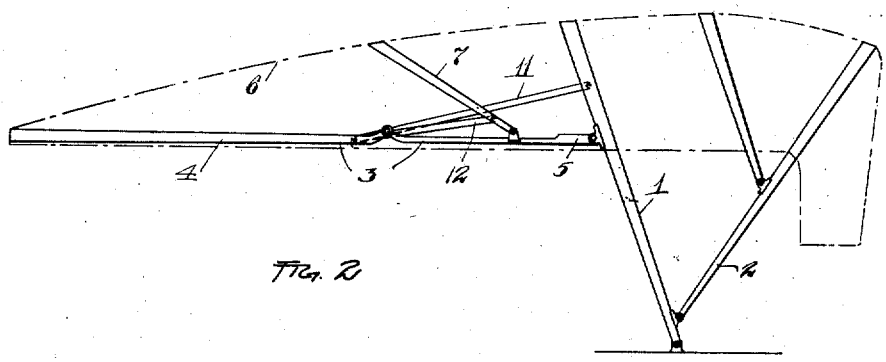
Figure 4:
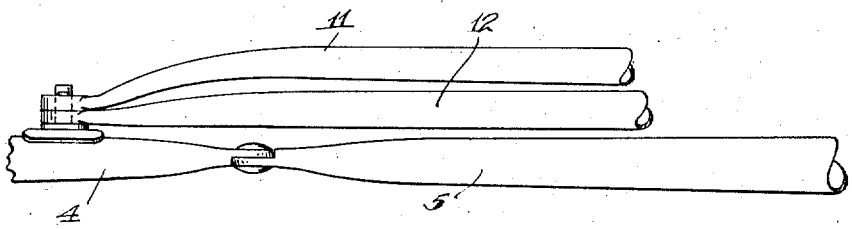

Figure 1 is a side elevation of the preferred type of my improved vehicle top; Fig. 2 is a similar view of a modified form of construction; Fig. 3 is a partial plan view of the bows in Fig. 1; and Fig. 4 is a partial plan view of the bows in Fig. 2.

It will be understood that the present top may be used on any desired type of vehicle, such as automobiles, carriages, boats and the like, although it has here, been illustrated for convenience as attached to the body of an automobile. The top has but one point of support upon the body of the vehicle, at which point two divergently extending rear bows 1 and 2 are pivotally attached. The forwardly extending one of such bows may be termed the main bow 1 and suitably attached to this bow, intermediate its ends, is a forwardly extending, articulated, auxiliary bow 3, the attachment being preferably a pivotal one. This auxiliary bow 3 is articulated at substantially the center; in other words it consists of a forward portion, 4 and rear portion or swinging arms, 5, the forward portion or bow proper 4 having attached to it the front end of the cover 6 of the top, and the arms 5 being pivotally attached to the corresponding sides of main bow 1. It is necessary in this type of tops to provide a bow similar to the present auxiliary bow which will lie substantially horizontal when extended, for the purpose of supporting the forward end of the top when in raised position, and this bow is variously termed in the trade, an outrigger or auxiliary bow. It is necessary, however, to properly brace or support this forwardly extending auxiliary bow in order that the same may not sway too greatly upon movement of the vehicle, and since there are to be no supports from the forward end of the vehicle to the auxiliary bow, other than the usual connection with the wind-shield hereinafter referred to, the bracing must be carried either to the rear portion of the vehicle or to the main or rear bows.

It is, furthermore, desirable, in order to present a neat appearance, to provide a supplemental bow 7 which is mounted upon the rear portion of the articulated auxiliary bow, that is, upon the swinging side arms 5. Said supplemental bow may be thus mounted, either pivotally as shown in Fig. 2, or both pivotally and slidably, as shown in Fig. 1. In such last-named figure, I provide the inner end of the bow 7 with a sleeve 8 which fits over the rear portion 5 of the auxiliary bow and has a limited movement with respect to the same, such movement being controlled by means of a pin 9 mounted upon the portion 5 and operating in a slot 10 formed in the sleeve 8. In Fig. 2, on the other hand, the supplemental bow is directly pivotally attached to the side arms 5. In either construction this supplemental bow extends upwardly and forwardly, being substantially parallel with the main bow and serves to support the top intermediate the main bow and the forward end of the auxiliary bow, thus giving a graceful curve to the top covering 6. The purpose of the slidable connection between bows 5 and 7 is to permit the use of a longer bow 7 thus dividing the space between bows 1 and 4 equally. It is only possible to use this longer bow when the same is slidably connected to the bow 5 since otherwise the bow 7 will not lie parallel to the bow 1 when folded. By the slidable connection the bow 7 is given two positions relative to the bow 5.

In the present construction I brace the forward portion 4 of the auxiliary bow from the upper part of the main bow. In this way the braces are hidden in the upper portion of the top and are not visible from the side of the vehicle. Braces 11 are pivotally attached to the upper portion of the main bow 1 above the point of attachment of the rear portion 5 of the auxiliary bow, and these braces are connected in any suitable manner with the forward portion of the auxiliary bow 3. This attachment of the braces 11 to the bow 3 may either be direct, as shown in Fig. 2, or indirect, as shown in Fig. 1, in which construction the outer end of the braces 11 are pivotally attached to other braces or struts 12 which are themselves pivotally attached to the forward portion of the auxiliary bow and to the supplemental bow 7. The struts 12 are pivoted to the portion 4 of the auxiliary bow adjacent to the rear end of the same and are disposed between the sides of the bow 3.

The members 11 and 12 indifferently referred to in the foregoing description as braces or struts might perhaps be better called links as being a more generic term without reference to the function which such members may respectively subserve. In fact, said links will obviously have a different operative effect in the extended condition of the top when all the parts are relatively stationary than they have when the top is being raised or lowered when such parts move relatively toward each other. It should further be observed in this connection that, when the top is extended, the point of connection between link 12 and the supplemental bow lies off (*i. e.*, below) the line passing through the points of connection of said link, and that of the other link 11 with the auxiliary and main bows, respectively; also that such link 11 in the same extended condition of the top lies below the joint that connects the auxiliary bow 4 and the swinging arm 5.

By the foregoing means it is possible to support the forward portion 4 of the auxiliary bow 3 from the upper portion of the main bow 1 and to hold in proper position the supplemental bow 7 by means of a strut extending from the forward portion of the auxiliary bow. All of the braces are covered by the downwardly extending sides of the top cover.

In order to fold the top it is necessary to first disconnect the same from the wind shield or other portion of the vehicle to which the forward end is usually attached, when the rear portion 5 of the supplemental bow is swung downward until parallel to the main bow in the position shown in dotted outline in Fig. 1. This action carries the forward portion 4 of the auxiliary bow alongside the rear portion and parallel with the same, and forces the supplemental bow 7 into a similar position parallel with a part of the rear portion 5 of the auxiliary bow and parallel with the upper part of the main bow. The brace 11 is swung forward into a similar parallel position, while the strut 12 which causes the movement of the supplemental bow is also to be found parallel with the latter when the top is thus folded. It is not necessary to manipulate any of the braces or to prepare any of the same for movement, it being sufficient to detach the forward end of the top from the wind shield or other supports and to swing the rear portion of the auxiliary bow downward into a position parallel with the main bow. There are no stop hinges in any of the braces or bows which must be broken before the top can be folded, nor are there any movements necessary except a single swinging down of the bow already referred to, this movement causing the positioning of all of the bows and braces parallel with the main bow.

The ease with which the present top may be folded constitutes one of its more important advantages, the others being its rigidity when extended and the simplicity of the construction. An additional advantage is the neat appearance of the top when raised, there being no braces, rods or the like visible from the side of the vehicle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a vehicle top, the combination of a main bow, an articulated auxiliary bow pivotally connected to said main bow, a supplemental bow pivotally and slidably attached to the rear portion of said auxiliary bow, struts pivotally attached to the forward portion of said auxiliary bow and connected to said supplemental bow to support the latter, and braces pivotally attached to said main bow and connected to said struts, thereby supporting the outer portion of said auxiliary bow.

2. In a vehicle top, the combination of a main bow, an articulated auxiliary bow pivotally connected to said main bow, a supplemental bow pivotally and slidably attached to the rear portion of said auxiliary bow, struts pivotally attached to the forward portion of said auxiliary bow and being similarly connected to the supplemental bow to support the latter, and braces pivotally attached to said main bow and being also pivotally connected to said struts adjacent to the point of attachment of the latter to the forward portion of said auxiliary bow, thereby supporting the latter.

3. In a vehicle top, the combination of a main bow, an articulated auxiliary bow pivotally connected to said main bow, a supplemental bow pivotally and slidably attached to the rear portion of said auxiliary bow, struts pivotally attached to said main bow and connected to the forward portion of said auxiliary bow, and bracing means pivotally attached to said supplemental bow and operating against said struts to support said supplemental bow.

4. In a vehicle top, the combination of a main bow; an articulated auxiliary bow pivotally connected to said main bow; links connecting said main bow with the forward portion of said auxiliary bow; and a supplemental bow shiftably attached to the rear portion of said auxiliary bow and operatively connected with the forward portion of the latter, so as to be folded and unfolded in unison therewith.

5. In a vehicle top, the combination of a main bow; an articulated auxiliary bow pivotally connected to said main bow; links connecting said main bow with the forward portion of said auxiliary bow; and a supplemental bow slidably attached to the rear portion of said auxiliary bow and operatively connected with the forward portion of the latter, so as to be folded and unfolded in unison therewith.

6. In a vehicle top, the combination of a main bow, an articulated auxiliary bow pivotally connected to said main bow, links pivotally attached to said main bow and connected to the forward portion of said auxiliary bow, a supplemental bow pivotally and slidably attached to the rear portion of said auxiliary bow, and bracing means pivotally attached to said supplemental bow and operating against said links to support said supplemental bow.

7. In a vehicle top, the combination of a main bow, an articulated auxiliary bow pivotally connected to said main bow, a supplemental bow pivotally and slidably attached to the rear portion of said auxiliary bow, links pivotally attached to the forward portion of said auxiliary bow and connected to said supplemental bow to support the latter, and other links pivotally attached to said main bow and connected to said first-named links, thereby supporting the outer portion of said auxiliary bow.

8. In a vehicle top, the combination of a main bow, an articulated auxiliary bow pivotally connected to said main bow, a supplemental bow pivotally and slidably attached to the rear portion of said auxiliary bow, links pivotally attached to the forward portion of said auxiliary bow and being similarly connected to the supplemental bow to support the latter and other links pivotally attached to said main bow and being also pivotally connected to said first-named links adjacent to the point of attachment of the latter to the forward portion of said auxiliary bow, thereby supporting the latter.

9. In a vehicle top, the combination of a main bow; a two-part articulated auxiliary bow, the rear portion of said bow being pivotally connected to said main bow; a supplemental bow pivotally connected to the rear portion of said auxiliary bow; and plural links directly pivotally connected together, the one such link having its one end pivoted to said main bow and another such link having its one end pivoted to the outer portion of said auxiliary bow at a point beyond the joint in said bow.

10. In a vehicle top, the combination of a main standard; an articulated auxiliary bow pivoted thereto; a supplemental bow pivoted to said auxiliary bow; a link pivoted at one end to said standard; and a second link pivoted at one end to said auxiliary bow; the other ends of said links and said supplemental bow being operatively interconnected.

11. In a vehicle top, the combination of a main standard; an articulated auxiliary bow pivoted thereto; a supplemental bow pivoted to said auxiliary bow; and a plurality of pivotally interconnected links, one of said links being pivotally connected with said standard and another with said auxiliary bow, and one of said links being further pivotally connected with said supplemental bow.

12. In a vehicle top, the combination of a main standard; an articulated auxiliary bow pivoted thereto; a supplemental bow pivotally connected to the rear portion of said auxiliary bow; and plural links connecting said standard and the outer portion of said auxiliary bow, said links being pivotally connected together and also operatively connected with said supplemental bow.

13. In a vehicle top, the combination of a main bow; an articulated auxiliary bow pivotally connected to said main bow; a supplemental bow pivotally connected to the rear portion of said auxiliary bow; and plural links connecting said main bow and the outer portion of said auxiliary bow, said links being directly pivotally connected together and also operatively connected with said supplemental bow.

14. In a vehicle top, the combination of a main bow, an articulated auxiliary bow pivotally connected to said main bow; a supplemental bow pivotally connected to the rear portion of said auxiliary bow; and two pivotally interconnected links connecting said main bow and the outer portion of said auxiliary bow, said links being operatively connected with said supplemental bow.

15. In a vehicle top, the combination of a main bow; an articulated auxiliary bow pivotally connected to said main bow; a supplemental bow pivotally connected to the rear portion of said auxiliary bow; and two pivotally interconnected links connecting said main bow and the outer portion of said auxiliary bow, the one of said links being also connected with said supplemental bow.

16. In a vehicle top, the combination of a main bow; an articulated auxiliary bow pivotally connected to said main bow; a supplemental bow pivotally connected to the rear portion of said auxiliary bow; and two pivotally interconnected links connecting said main bow and the outer portion of said auxiliary bow, the forward one of said links being also directly pivotally connected with said supplemental bow.

17. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of one of the aforementioned bows; and other links connecting said first-named links with the sides of the other such aforementioned bow.

18. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of said auxiliary bow; and other links connecting said first-named links with the sides of said main bow.

19. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of one of the aforementioned bows; and other links connecting said first-named links with the sides of the other such aforementioned bow, the points of connection of said first-named links with said supplemental bow lying off the line passing through the points of connection of said links with such aforementioned bows, respectively, when the top is extended.

20. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of one of the aforementioned bows; and other links connecting said first-named links with the sides of the other such aforementioned bow, the points of connection of said first-named links with said supplemental bow lying below the line passing through the points of connection of said links with such aforementioned bows, respectively, when the top is extended.

21. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of said auxiliary bow; and other links connecting said first-named links with the sides of said main bow, the points of connection of said first-named links with said supplemental bow lying below the line passing through the points of connection of said links with such aforementioned bows, respectively, when the top is extended.

22. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of one of the aforementioned bows; and other links connecting said first-named links with the sides of the other such aforementioned bow, the links thus connected with said auxiliary bow lying below the joints that connect said auxiliary bow with said arms, when the top is extended.

23. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of one of the aforementioned bows; and other links connecting said first-named links with the sides of the other such aforementioned bow, the points of connection of said first-named links with said supplemental bow lying below the line passing through the points of connection of said links with such aforementioned bows, respectively, when the top is extended, and the links thus connected with said auxiliary bow at the same time lying below the joints that connect said auxiliary bow with said arms.

24. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of said auxiliary bow; and other links connecting said first-named links with the sides of said main bow, said first-named links lying below the joints that connect said auxiliary bow with said arms, when the top is extended.

25. In a vehicle top, the combination of a main bow; an auxiliary bow; arms pivotally attached to said main bow and said auxiliary bow, whereby the latter may be supported from the former in substantially horizontal position; a supplemental bow pivotally supported on said arms; links connecting the sides of said supplemental bow with the corresponding sides of said auxiliary bow; and other links connecting said first-named links with the sides of said main bow, the points of connection of said first-named links with said supplemental bow lying below the line passing through the points of connection of said links with such aforementioned bows, respectively, when the top is extended, and said first-named links at the same time lying below the joints that connect said auxiliary bow with said arms.

Signed by me this 27th day of February, 1918.

FREDRICK L. TESMER.

Attested by—
RICHARD BRUDY,
H. B. FAY.